US010293938B2

(12) United States Patent
Thompson et al.

(10) Patent No.: US 10,293,938 B2

(45) Date of Patent: May 21, 2019

(54) UNMANNED AIRCRAFT SYSTEMS WITH A CUSTOMER INTERFACE SYSTEM AND METHODS OF DELIVERY UTILIZING UNMANNED AIRCRAFT SYSTEMS

(71) Applicant: Walmart Apollo, LLC, Bentonville, AR (US)

(72) Inventors: John P. Thompson, Bentonville, AR (US); Donald R. High, Noel, MO (US); Nathan G. Jones, Bentonville, AR (US); David C. Winkle, Bella Vista, AR (US); Brian G. McHale, Chadderton Oldham (GB)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/447,474

(22) Filed: Mar. 2, 2017

(65) Prior Publication Data

US 2017/0253335 A1 Sep. 7, 2017

Related U.S. Application Data

(60) Provisional application No. 62/302,588, filed on Mar. 2, 2016.

(51) Int. Cl.

*B64D 1/22* (2006.01)
*B64C 39/02* (2006.01)

(Continued)

(52) U.S. Cl.

CPC .............. *B64D 1/22* (2013.01); *B64C 39/024* (2013.01); *B64D 9/00* (2013.01); *G05D 1/0011* (2013.01);

(Continued)

(58) Field of Classification Search

CPC .................................... B64D 1/12; B64D 1/22

See application file for complete search history.

(56) References Cited

U.S. PATENT DOCUMENTS 5,020,742 A * 6/1991 Haslim .................... B64D 1/22 244/137.2

5,190,250 A * 3/1993 DeLong .................. B64D 1/22 244/118.1

(Continued)

FOREIGN PATENT DOCUMENTS

CN 204406476 6/2015

OTHER PUBLICATIONS

Idea; "Idea Internet Network IIN Drone 90 sec TVC"; Published on May 5, 2015; 5 pages.

(Continued)

*Primary Examiner* — Alex C Dunn

(74) *Attorney, Agent, or Firm* — Fitch, Even, Tabin & Flannery LLP

(57) ABSTRACT

In some embodiments, systems and methods are provided to enable package delivery and interaction with customers. Some embodiments comprise unmanned aircraft system (UAS), comprising: a crane system comprising a first spool system and a crane motor, the first spool system comprises a first cord that is extended and retracted; a retractable interface system cooperated with the first cord; a package holder configured to hold a first package to be delivered by the UAS at a delivery location; a control circuit coupled with the crane motor to control the crane motor, and to activate the crane motor to extend the first cord and lower the retractable interface system while the UAS is maintained in flight at least at a threshold height; wherein the retractable interface system comprises an input interface to receive input from a customer at the delivery location.

18 Claims, 4 Drawing Sheets

(51) Int. Cl.

| | |
|---|---|
| ***B64D 9/00*** | (2006.01) |
| ***G05D 1/00*** | (2006.01) |
| ***G06Q 10/08*** | (2012.01) |
| *B64D 47/08* | (2006.01) |

(52) U.S. Cl.
CPC ...... *G06Q 10/083* (2013.01); *B64C 2201/128* (2013.01); *B64C 2201/146* (2013.01); *B64D 47/08* (2013.01)

(56) References Cited

U.S. PATENT DOCUMENTS

| | | | | |
|---|---|---|---|---|
| 8,738,198 | B2 * | 5/2014 | Schempf | B25J 11/002 701/2 |
| 8,948,935 | B1 | 2/2015 | Peeters | |
| 9,022,322 | B2 * | 5/2015 | Westbrook, Sr. | B64C 39/024 244/137.1 |
| 9,070,101 | B2 | 6/2015 | Abhyanker | |
| 9,102,405 | B2 * | 8/2015 | Zhang | B64C 39/022 |
| 9,174,733 | B1 | 11/2015 | Burgess | |
| 9,321,531 | B1 * | 4/2016 | Takayama | B64D 1/12 |
| 9,550,577 | B1 | 1/2017 | Beckman | |
| 9,567,081 | B1 * | 2/2017 | Beckman | B64D 1/12 |
| 9,573,684 | B2 | 2/2017 | Kimchi | |
| 9,650,134 | B2 * | 5/2017 | Chappell | B64C 39/024 |
| 9,676,481 | B1 * | 6/2017 | Buchmueller | B64D 1/12 |
| 9,688,404 | B1 * | 6/2017 | Buchmueller | B64D 1/12 |
| 9,731,839 | B1 * | 8/2017 | Beckman | B64C 39/024 |
| 9,747,901 | B1 * | 8/2017 | Gentry | G10L 15/22 |
| 9,753,355 | B2 * | 9/2017 | Waibel | G03B 15/006 |
| 9,764,836 | B1 * | 9/2017 | Elzinga | B64C 39/024 |
| 9,818,304 | B2 * | 11/2017 | Modica | G05D 1/0676 |
| 9,824,324 | B2 * | 11/2017 | Trew | G06Q 10/0836 |
| 2011/0084162 | A1 | 4/2011 | Goossen | |
| 2012/0091261 | A1 | 4/2012 | Lee | |
| 2012/0112008 | A1 * | 5/2012 | Holifield | B64C 27/02 244/155 A |
| 2012/0152654 | A1 | 6/2012 | Marcus | |
| 2013/0233964 | A1 * | 9/2013 | Woodworth | B64C 37/02 244/2 |
| 2014/0025230 | A1 | 1/2014 | Levien | |
| 2014/0254896 | A1 | 9/2014 | Zhou | |
| 2015/0006005 | A1 | 1/2015 | Yu | |
| 2015/0120094 | A1 | 4/2015 | Kimchi | |
| 2015/0183528 | A1 | 7/2015 | Walsh | |
| 2015/0277440 | A1 | 10/2015 | Kimchi | |
| 2015/0301150 | A1 | 10/2015 | Stuckman | |
| 2016/0196755 | A1 | 7/2016 | Navot | |
| 2016/0257401 | A1 | 9/2016 | Buchmueller | |
| 2017/0011333 | A1 * | 1/2017 | Greiner | G06Q 10/083 |
| 2017/0011340 | A1 * | 1/2017 | Gabbai | G06Q 10/0836 |
| 2017/0110017 | A1 | 4/2017 | Kimchi | |
| 2017/0161725 | A1 * | 6/2017 | Hosp | G06Q 20/354 |

OTHER PUBLICATIONS

Kelly Murphy, Samantha; “Fingrerprint and Eye-Scanning Drones to Make Deliveries in UAE”; http://mashable.com/2014/02/10/uaedronesdeliveries/#aqmQwxdBZ8qT; Feb. 10, 2014; 7 pages.

PCT; App. No. PCT/US2017/018786; International Search Report and Written Opinion dated May 4, 2017.

* cited by examiner

UNMANNED AIRCRAFT SYSTEMS WITH A CUSTOMER INTERFACE SYSTEM AND METHODS OF DELIVERY UTILIZING UNMANNED AIRCRAFT SYSTEMS

CROSS-REFERENCE TO RELATED APPLICATION

This application claims the benefit of U.S. Provisional Application No. 62/302,588, filed Mar. 2, 2016, which is incorporated herein by reference in its entirety.

TECHNICAL FIELD

This invention relates generally to unmanned aircraft systems (UAS).

BACKGROUND

In a modern retail environment, there is a need to improve the customer service and/or convenience for the customer. One aspect of customer service is the delivery of products. There are numerous ways to deliver products to customers. Getting the product to a delivery location, however, can cause undesirable delays, can add cost, and can reduce revenue.

BRIEF DESCRIPTION OF THE DRAWINGS

Disclosed herein are embodiments of systems, apparatuses and methods pertaining to unmanned aircraft systems with an interface system. This description includes drawings, wherein.

Figure 1:
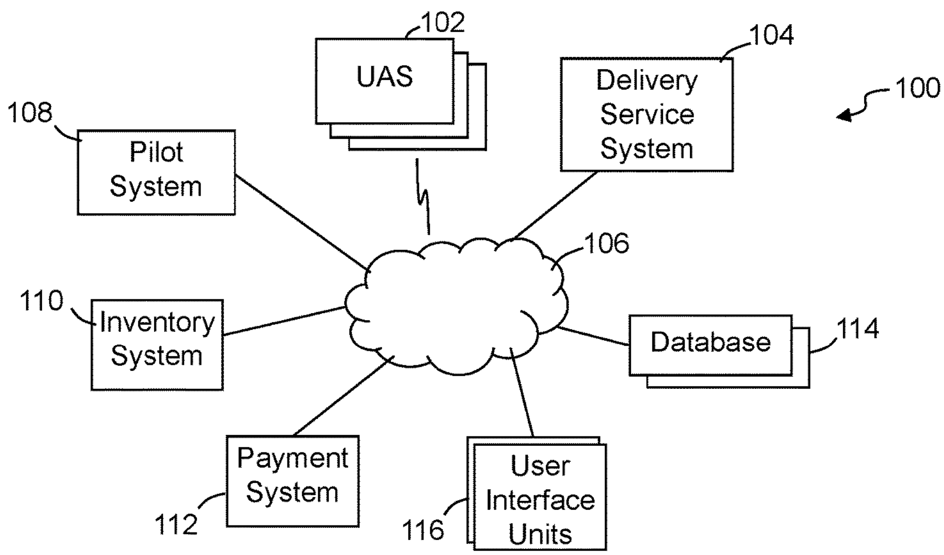
FIG. 1 illustrates a simplified block diagram of an exemplary product delivery system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses, methods and processes are provide unmanned aircraft systems (UAS) that enable a customer to interact with a customer interface. Some embodiments include UASs that include an interface system that allow customers to interact with the UAS and/or a delivery service. In some implementations, the UASs include a crane system having a spool system and a crane motor cooperated with the spool system. The spool system may include a cord, cable, rope, or other structure that is extended and retracted in response to the crane motor driving the spool. A retractable interface system can be cooperated with the cord. Typically, the UAS further includes a package holder configured to hold a package to be delivered by the UAS at a delivery location. A control circuit can with the crane motor to control the crane motor. The control circuit can couple with memory that stores computer instructions that when executed by the control circuit cause the control circuit to control the crane motor to extend or retract the cord in order to lower or raise the retractable interface system. The control circuit and/or crane system is configured to further lower the interface system while the UAS is maintained in flight at least at a threshold height. The retractable interface system includes an input interface to receive input from a customer at the delivery location.

FIG. 1 illustrates a simplified block diagram of an exemplary product delivery system 100, in accordance with some embodiments. The product delivery system includes multiple UASs 102, and a delivery service system 104 that are communicatively coupled through one or more distributed communication and/or computer networks 106 (e.g., WAN, LAN, Internet, other such communication networks, or combination of two or more of such networks). In some implementations, the product delivery system 100 includes one or more pilot systems 108, inventory systems 110, and payment systems 112. The system typically further includes and/or accesses one or more databases 114, which may include one or more remote databases that are accessed over the distributed communication network 106. Further, one or more user interface units 116 may be part of and/or in communication with one or more components of the product delivery system 100.

In some applications, the UASs are configured to carry one or more packages and deliver the package to a delivery location. Often, a customer may be at the delivery location and/or may be required to be at the delivery location for the delivery to commence and/or be completed. The delivery service system 104 can obtain and/or determine delivery schedules that are implemented by directing the UASs to deliver the one or more packages. The delivery schedules can take into consideration numerous factors, such as but not limited to UASs available, packages to be delivered, capabilities of UASs, size and/or weight of packages, distance to be carried by a UAS, delivery vehicles transporting packages and/or UASs, delivery location, expected interaction with customers, whether interaction with a customer is required, confirmation of customer's availability, other factors, and typically a combination of two or more of such factors.

Some embodiments include pilot systems 108 that allow remote UAS pilots to take over and control at least part of the functionality and/or flight controls of respective UASs. The pilots may control the UASs during an entire delivery flight, during only a portion of the flight, or in response to an event, error or other condition. For example, a pilot may be notified when a UAS is within a threshold distance of a delivery location, and the pilot may take over flight control to implement the delivery of the package at the delivery location. Further, in some instances, the pilot may receive information from the UAS and/or customer that can be taken into consideration while controlling the UAS. Typically, the pilot system provides wireless communication with one or more UASs to receive information from the UAS (e.g., video data, image data, flight conditions data, UAS operating conditions data, external conditions data, etc.). The pilot can issue commands through the pilot system that are wirelessly communicated to a respective UAS that are implemented by the UAS allowing the pilot to control the flight of the UAS.

The payment system 112 may be included to receive communications from the UAS, an interface system of the UAS, a user interface system, or other source to allow and/or confirm payment by a customer. In some implementations, for example, a customer may provide a method of paying for a product at the time of delivery. Accordingly, the payment system may receive relevant payment information to initiate the payment.

The user interface units 116 allow customers and/or workers associated with the UAS delivery to communicate with the UASs, delivery service system, payment system, pilot system, and/or other entities. The user interface units can be substantially any relevant device that provides a user with communication capabilities, such as but not limited to smart phones, tablets, optical head-mounted display systems, smart watch systems, computers, laptops, phones, and other such consumer electronic user devices.

Figure 2:
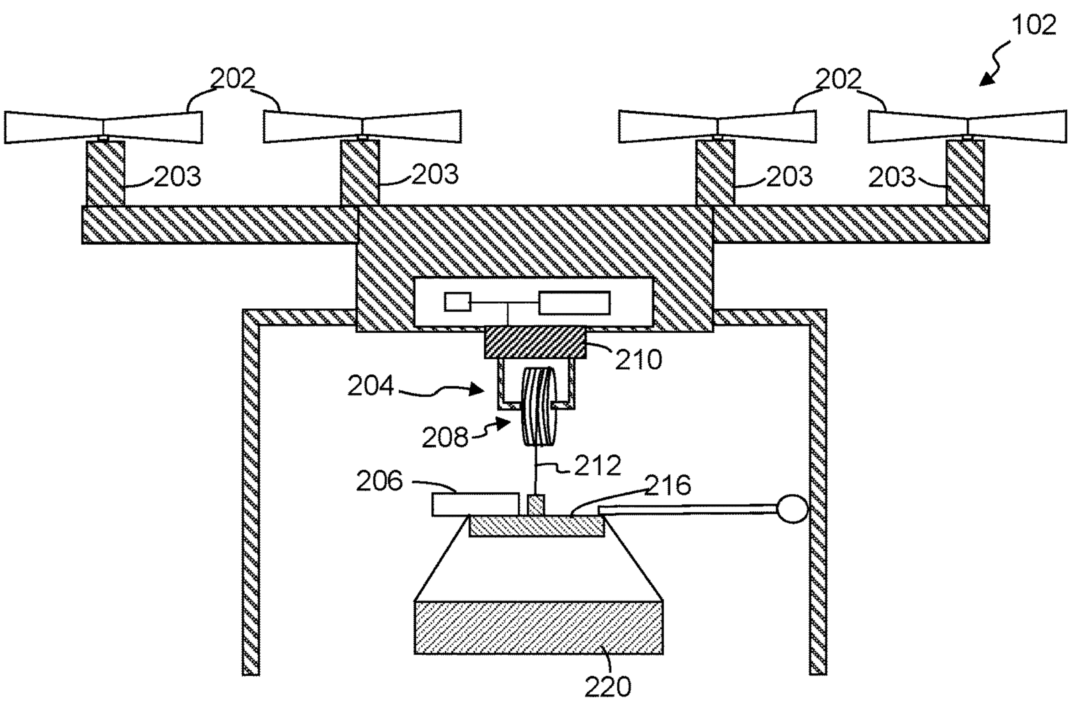
FIG. 2 illustrates a simplified, partial cross-sectional view of an exemplary UAS, in accordance with some embodiments.

FIG. 2 illustrates a simplified, partial cross-sectional view of an exemplary UAS 102, in accordance with some embodiments. In some implementations, the UAS includes multiple propellers 202 that cooperate with one or more propeller motors 203. The number and configuration of the propellers can depend on various aspects, such as but not limited to the size of UAS, intended lift capacity, range of travel, other such factors, and typically a combination of two or more of such factors. The propellers allow the UAS to lift one or more packages 220 and carry the one or more packages to one or more desired delivery sites. Typically, the propellers can be cooperatively controlled, in some instances, to hover over a desired delivery location. In some implementations, the UAS further includes a crane system 204 that enables the lowering of at least a retractable interface system 206. Additionally, in some applications, the UAS includes a package holder 216 that is configured to secure and/or hold at least one package that is to be delivered by the UAS at a delivery location.

In some application, the crane system 204 includes one or more spool systems 208 and one or more crane motors 210 that are fixed with the UAS and that cooperate with at least one spool system. The spool system typically, includes at least one cord 212, cable, rope, or other structure that is extended and retracted in response to the crane motor driving the spool system. The retractable interface system 206 is cooperate with the cord 212. Accordingly, the interface system can be lowered and raised as the spool system spools out and rewinds the cord, respectively. Further, in some embodiments, the spooling system includes one or more rotational drive shafts that is rotated by the crane motor to cause rotation of the spool in extending and retracting the cord.

Figure 3:
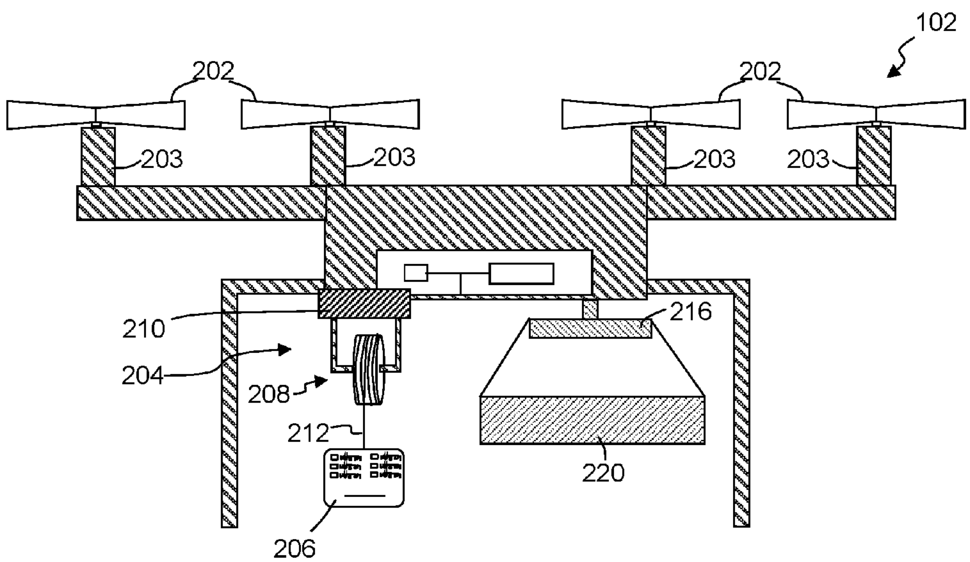
FIG. 3 illustrates a simplified, partial cross-sectional view of an exemplary UAS, in accordance with some embodiments.

In the embodiment depicted in FIG. 2, the interface system 206 is cooperated with the cord 212 through the package holder 216. In other embodiments, however, the interface system may be directly cooperated with the cord. FIG. 3 illustrates a simplified, partial cross-sectional view of an exemplary UAS 102, in accordance with some embodiments. In this embodiment, the interface system 206 is directly cooperated with the spool system 208 such that upon activation of the spool system, the interface system can be lowered or raised independent of the one or more packages 220 carried and delivered by the UAS 102.

Figure 4:
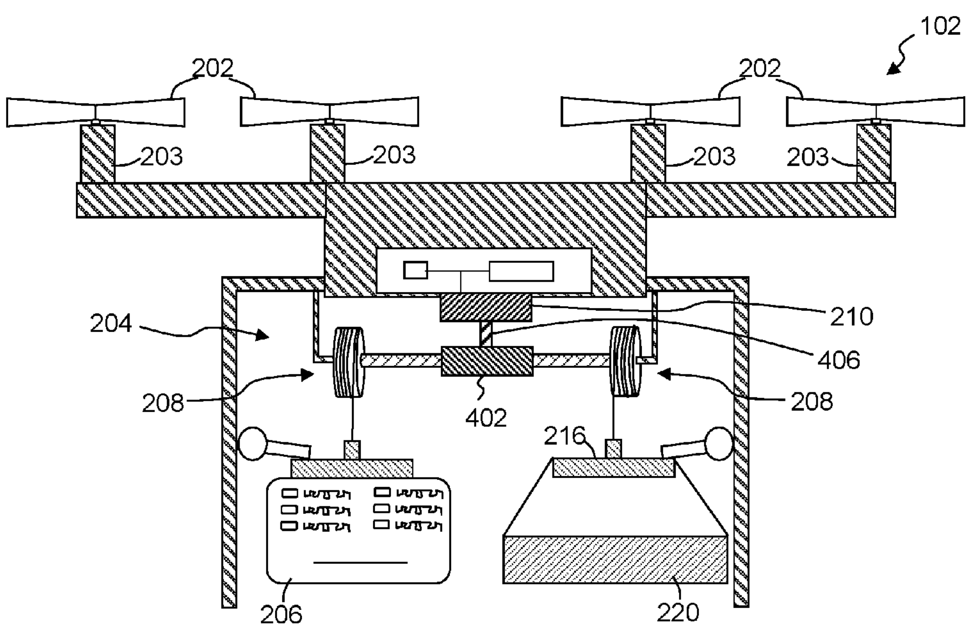
FIG. 4 illustrates a simplified, partial cross-sectional view of an exemplary UAS, in accordance with some embodiments.

Some embodiments include multiple crane systems 204 and/or a crane system includes multiple spool systems 208 that can be selectively activated by one or more crane motors 210. FIG. 4 illustrates a simplified, partial cross-sectional view of an exemplary UAS 102, in accordance with some embodiments, that includes multiple spool systems 208 that couple to and/or can be selectively cooperated with the crane motor or motors 210. Each spool system typically includes at least one cord 212, cable, rope, or the like that is unwound and rewound through the respective spool systems. In this illustrate embodiment, the interface system 206 is cooperated with a first spool system while a package holder 216 is cooperated with a second spool system. In some embodiments, the UAS 102 further includes a transmission 402, gear shift, or other such system that cooperates with a drive shaft 406. The transmission can selectively couple the drive shaft 406 with one or more of the spool systems 208 and/or selectively activates one or more of the crane systems. The rotation of the drive shaft can control the crane system in controlling the unspooling and retraction of one or more cords. A control system can couple with and control the transmission to selectively cooperate the drive shaft with one of the two or more spool systems. The control system can additionally control the crane motor 210 to drive the drive shaft to rotate the selected one of the crane systems cooperated through the transmission with the drive shaft in preforming one of unspooling and retracting the corresponding cord.

In some implementations, the crane system 204 allows the interface system 206 to be lowered to allow a customer or other individual to interact with the user interface system while the UAS hovers above the delivery location or other relevant location. In some applications, the UAS hovers at or above a threshold height above the ground and/or delivery location. The UAS can maintain a stable hover above an intended package drop point (e.g., around 10-50 feet off above the intended package drop point and/or the ground). Maintaining the aircraft at an elevation can make customer interaction and/or the delivery safer to both humans, animals, property, and the like, for example because they would not encounter the spinning propellers 202 of the UAS. The UAS, while hovering, can lower the interface system 206, and in some instances a package 220 through one or more crane systems 204.

Further, some embodiments may lower the package 220 through a crane system 204. A crane system and/or the package holder 216 can further include and/or cooperate with a package release system. In some implementations, the UAS control circuit 502 or a crane system control circuit can trigger the release of a package, while in other implementations the package release system is a mechanical release without need of communication to trigger the release. For example, a change in force and/or a reduction in force on a package release system in response to the package contacting the ground or other delivery surface may activate a release of the package from the package holder.

The crane system, the UAS and/or the release system may in some embodiments be implemented in accordance with or similar to the UAS, crane systems, and/or release system described in U.S. Provisional Application No. 62/222,572, for Nathan G. Jones et al., filed Sep. 23, 2015 and entitled SYSTEMS AND METHODS OF DELIVERING PRODUCTS WITH UNMANNED DELIVERY AIRCRAFTS, and U.S. Provisional Application No. 62/222,575, for Nathan G. Jones, filed Sep. 23, 2015, and entitled PACKAGE RELEASE SYSTEM FOR USE IN DELIVERY PACKAGES, AND METHODS OF DELIVERING PACKAGES, which are incorporated herein by reference in their entirety.

Figure 5:
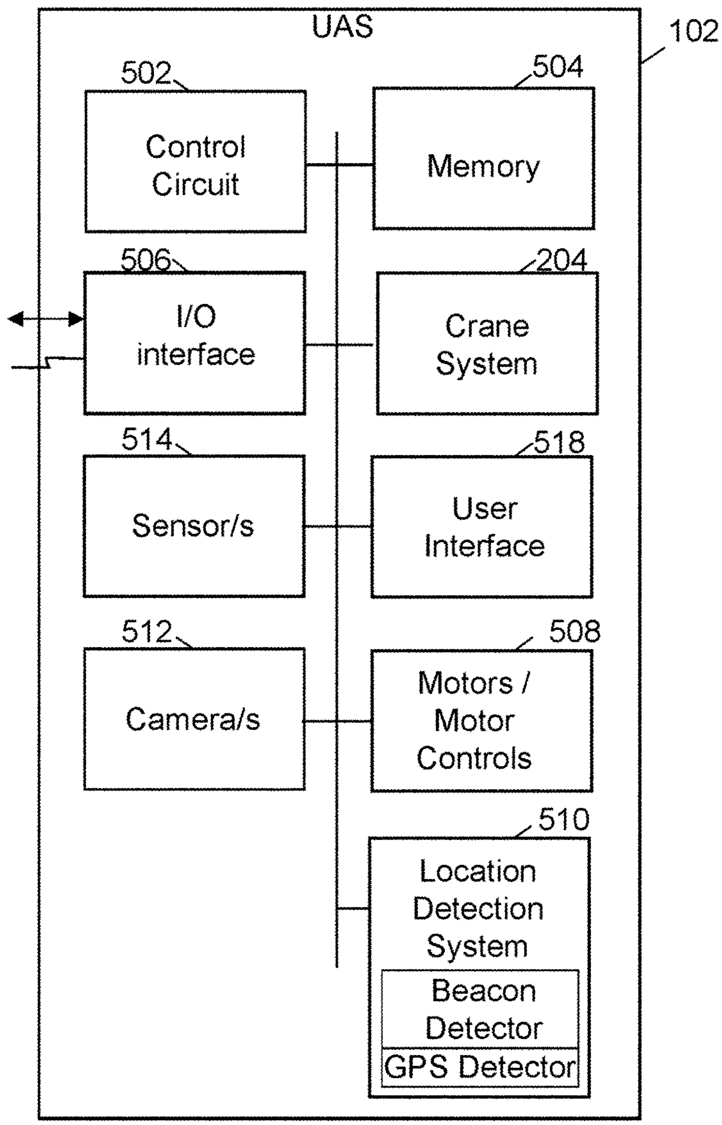
FIG. 5 illustrates a simplified block diagram of an exemplary UAS, in accordance with some embodiments.

FIG. 5 illustrates a simplified block diagram of an exemplary UAS 102, in accordance with some embodiments. The UAS includes one or more UAS control circuits 502 coupled with the crane motor 210 of the crane system 204 to control the crane motor. In other implementations, the UAS control circuit may couple with a separate crane control circuit that receives instructions from the UAS control circuit 502 and controls the crane motor. One or more computer and/or processor readable memory 504 couples with and/or is accessible by the UAS control circuit 502. The memory stores computer instructions that when executed by the UAS control circuit 502 cause the UAS control circuit to activate the crane motor to extend and retract the cord 212 to lower and raise the retractable interface system 206. Further, the UAS control circuit is typically configured to control the spool system the UAS is maintained in flight at least at a threshold height. The UAS typically further includes one or more input/output (I/O) interfaces and/or devices 506, motors 203 and motor control circuitry 508, location detection systems 510. Some embodiments further include one or more sensors 514, one or more cameras 512, a user interface 518, and/or other such systems.

The UAS control circuit 502 typically comprises one or more processors and/or microprocessors and couples with the memory 504 that stores operational codes or sets of instructions that are executed by the UAS control circuit 502 and/or processor to implement the functionality of the UAS 102. In some embodiments, the memory 504 may also store some or all of particular data that may be needed to at least navigate between at least one or more launch locations and an intended delivery location.

It is understood that the UAS control circuit 502 may be implemented as one or more processor devices as are well known in the art. Similarly, the memory 504 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 504 is shown as internal to the UAS 102; however, the memory 504 can be internal, external and wirelessly accessible, or a combination of internal and external memory. Additionally, the UAS typically includes one or more power supplies (not shown) that is typically rechargeable, and/or it may receive power from an external source. While FIG. 5 illustrates the various components being coupled together via a bus, it is understood that the various components may actually be coupled to the UAS control circuit 502 and/or one or more other components directly.

Generally, the UAS control circuit 502 and/or electronic components of the UAS 102 can comprise fixed-purpose hard-wired platforms or can comprise a partially or wholly programmable platform. These architectural options are well known and understood in the art and require no further description here. The UAS and/or UAS control circuit can be configured (for example, by using corresponding programming as will be well understood by those skilled in the art) to carry out one or more of the steps, actions, and/or functions described herein. In some implementations, the UAS control circuit 502 and the memory 504 may be integrated together, such as in a microcontroller, application specification integrated circuit, field programmable gate array or other such device, or may be separate devices coupled together.

The I/O interface 506 allows wired and/or wireless communication coupling of the UAS 102 to external components, such as the pilot systems 108, delivery service system 104, databases 114, user interface units 116 (e.g., smart phone, tablet, optical head-mounted display systems, smart watch systems, and other such consumer electronic user devices), in some instances one or more other UAS, and other such devices or systems. Typically, the I/O interface 506 provides at least wireless communication (e.g., cellular, Wi-Fi, Bluetooth, RF, and/or other such wireless communication), and in some instances may include any known wired and/or wireless interfacing device, circuit and/or connecting device, such as but not limited to one or more transmitter, receiver, transceiver, etc.

The location detection system 510 obtains location information to determine a current location of and track the location and movements of the UAS. The UAS control circuit 502 utilizes the location information in controlling the movements of the UAS. In some instances, the location detection system may include a global positioning detection system and/or system that received global positioning coordinate information, Wi-Fi signal triangulation and/or evaluation system, cellular tower triangulation system, and/or other such location detection system. In some embodiments, the location detection system 510 includes and/or couples with one or more beacon signal detectors that receives beacon signals from one or more wireless beacons, global positioning satellite (GPS) system, and/or other such location information acquisition systems. Further, the location detection system may use information provided by one or more sensors 514 in determining and/or tracking location information. The sensors can include substantially any relevant sensor such as, but not limited to, one or more inertial sensors, accelerometers, altimeters, gyroscopes, compass, distance measurement systems (e.g., ultrasound, laser, etc.), and/or other such sensor information. Other sensors 514 may be included that may or may not be used for location detection, such as but not limited to wireless signal strength sensor, weather sensors, and the like.

The UASs 102 may further include one or more cameras 512 that capture images and/or video that can be evaluated by the UAS control circuit 502, pilot systems, pilots at the pilot systems, and/or other systems. In operation, the UAS control circuit 502 of the UAS can activate one or more of the cameras 512, and in some implementations activates a cameras based on a predefined delivery sequence (e.g., when within a threshold distance of a delivery location activate a camera to capture images and/or video, when hovering over a delivery location, while lowering a package by a crane system 204, and the like), in response to a command from the pilot system and/or delivery service system, and the like. Some embodiments include different cameras directed in different general directions (e.g., up, down, forward, backwards), additionally or alternatively, one or more cameras may be cooperated with camera directional control systems (e.g., motors, tracks, gimbals, etc.) that can control the movement of one or more cameras. In some embodiments, one or more pictures and/or video captured by the camera/s 512 of the UAS can be evaluated for one or more parameters, rules and/or conditions. For example, one or more images and/or video can be captured by the UAS of a delivery location, and can be evaluated to identify and/or confirm a location of a delivery pad, a locker, that people and/or pets are not within a threshold distance, determine whether delivery should commence and/or continue based on one or more rules and/or conditions, and other such actions.

In some implementations, the UAS may include one or more user interfaces 518 that can be used for user input and/or output display. For example, the user interface 518 may include any known input devices, such one or more buttons, knobs, selectors, switches, keys, touch input surfaces, audio input, and/or displays, etc. Additionally, the user interface 518 includes one or more output display devices, such as lights, visual indicators, display screens, etc. to convey information to a user. Similarly, the user interface 518 in some embodiments may include audio systems that can receive audio commands or requests verbally issued by a worker, and/or output audio content, alerts and the like.

The UAS control circuit 502 and/or a control circuit of the crane system can control the descent of the interface system 206 and/or package 220 by controlling a rate at which the UAS drops in elevation, and/or controlling the rate of spooling by the crane system in lowering the user interface system and/or package. In some embodiments, the user interface system is in wired and/or wireless communication with the UAS to provide commands, instructions, requests, data, and/or other information. The UAS may, in some applications, act as a relay between the user interface system and one or more external components (e.g., the pilot system, the payment system 112, the delivery service system 104, the inventory system 110, user interface units 116, other such components, or a combination of two or more of such components). In other instances, the user interface system may directly communicate via wired and/or wireless communication (e.g., cellular, Wi-Fi, Bluetooth, etc.) with one or more of the external components.

Figure 6:
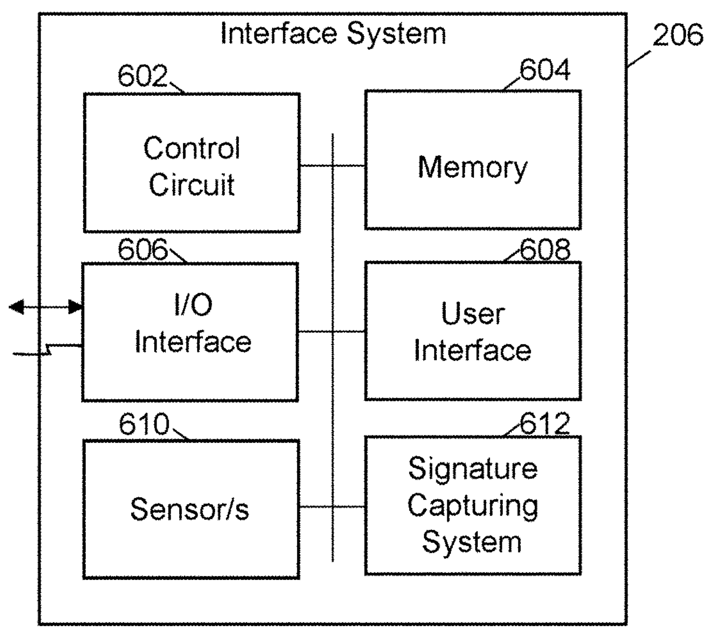
FIG. 6 illustrates a simplified block diagram of an exemplary retractable interface system in accordance with some embodiments.

FIG. 6 illustrates a simplified block diagram of an exemplary retractable interface system 206 in accordance with some embodiments. The interface system is configured allow customer, workers or the like to interact with the UAS 102, payment system 112, pilot system 108, delivery service system 104, and/or other such remote components. In this example, the interface system 206 includes an interface system control circuit 602, memory 604, one or more input/output (I/O) interfaces 606, and a user interface 608. The user interface allows the customer, worker or other such person to interact with the interface system and/or the UAS. For example, the user interface includes a payment method system (e.g., a credit card swipe system), one or more audio outputs, one or more audio inputs, one or more display screens, and substantially any known input device, such one or more buttons, knobs, selectors, switches, keys, touch input surfaces, scanners, displays, etc. Additionally, the user interface may include one or more output display devices, such as lights, visual indicators, display screens, etc. to convey information to a user, such as status information of the interface system 206 and/or the UAS, package and/or product information of a package and/or product being delivered, payment information, payment balance due information, scheduled product delivery information, delivery location information, customer location information, product information, product identifiers, customer profile information, graphical user interfaces, purchase information, notifications, errors, conditions and/or other such information. Additionally, the interface system includes and/or couples with a power supply (not shown).

The interface system control circuit 602 typically comprises one or more processors and/or microprocessors. The interface system control circuit couples with and/or includes the memory 604. Generally, the memory 604 stores the operational code or one or more sets of instructions that are executed by the interface system control circuit 602 and/or processor to implement the functionality of the interface system. In some implementations, the memory further stores code, instructions and corresponding data to allow the interface system to provide information to customers and/or other users, and allow the customer or other user to interact with the interface system. Such data may be pre-stored in the memory or be received, for example, from an inventory system 110, delivery service system 104, payment system 112, pilot system 108, database 114, other sources, or combinations of such sources.

The control circuit may be implemented as one or more processor devices as are well known in the art. Similarly, the memory 604 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 604 is shown as internal to the interface system; however, the memory 604 can be internal, external or a combination of internal and external memory. In some instances, the control circuit 602 and the memory 604 may be integrated together, such as in a microcontroller, application specification integrated circuit, field programmable gate array or other such device, or may be separate devices coupled together. In some applications, the control circuit 602 comprises a fixed-purpose hard-wired platform or can comprise a partially or wholly programmable platform. These architectural options are well known and understood in the art and require no further description here. The interface system control circuit can be configured (for example, by using corresponding programming as will be well understood by those skilled in the art) to carry out one or more of the steps, actions, and/or functions described herein.

The one or more I/O interfaces 606 allow wired and/or wireless communication coupling of the interface system control circuit 602 and/or the interface system to external components, such as other interface systems of the UAS, an inventory system, delivery service system, payment system, one or more databases, user interface units, and other such components. Accordingly, the I/O interface 606 may include any known wired and/or wireless interfacing device, circuit and/or connecting device, such as but not limited to transceivers, receivers, transmitters, and the like. For example, in some implementations, the I/O interface 606 provides wireless communication in accordance with one or more wireless protocols (e.g., cellular, Wi-Fi, Bluetooth, radio frequency (RF), other such wireless communication, or combinations of such communications). While FIG. 6 illustrates the various components being coupled together via a bus, it is understood that the various components may actually be coupled to the control circuit 602 and/or one or more other components directly.

In some embodiments, the interface system 206 includes and/or couples with one or more sensors 610 and/or other such input devices. For example, the interface system may include or couple with one or more height detection systems, one or more stop switches, other such sensors, or combination of two or more of such sensors.

The interface system control circuit may further communicate with the UAS 102. Information such as customer acknowledgments, customer requests, customer rejection of delivery, activation commands, overrides, halt commands, and the like can be communicated via wired and/or wireless communication. In some instances, the interface system control circuit can activate the UAS to implement one or more actions. For example, an input received through the retractable interface system can be communicated to the UAS control circuit 502 and the UAS control circuit can cause the UAS to implement one or more actions in response to the input. This can include triggering the crane motor 210 to retract or lower the interface system, move to a different delivery location (e.g., shift five feet to the right), not delivery a package, release a package, and/or other such actions. For example, a user can activate a button or other indicator on the user interface 608 acknowledging receipt of a package, and the UAS can withdraw from the delivery location. In some embodiments, interface system includes a signature capturing system 612 configured to capture a signature from the customer as part of a delivery process in delivering a package. In some instances, this cooperates with a touch screen that detects contact by a customer's finger, a stylus, or the like.

Some embodiments, in delivering a package further obtain proof of a customer's identity. This proof can be based on a passcode, communication from a user interface unit, scanning a customer's government issued identification, scanning an order acknowledgment, entering an order number and/or acknowledgement number, other such proof, or combination of two or more of such methods. In some embodiments, for example, the input interface is configured to allow a customer to enter a delivery authentication specific to an ordered product being delivered. A transceiver of the interface system can communicate the delivery authentication to the control circuit 502 and/or crane system control circuit to be used in authorizing the delivery of a package carried by the UAS.

In some embodiments, the interface system includes one or more wireless transceivers that can wirelessly receive an authentication communication from a user interface unit 116 associated with the customer. The interface system control circuit 602, UAS control circuit 502 or other component can confirm an authorization to deliver a package based on the authentication communication and initiate the delivery of the package. In some embodiments, for example, the UAS control circuit may further communicate the authentication communication to the delivery service system 104 and/or payment system 112 to confirm the customer and delivery prior to delivering the package.

Further, in some embodiments, the interface system 206 can be configured to provide a return request as an input. The return request can allow a customer to request a different package be returned. The interface system can relay the return request to the UAS and the UAS control circuit can activate the crane system 204 in response to the return request. This may include lowering a package coupler and allowing the customer to cooperate the package coupler with the package being returned, and hoisting the return package from the delivery location. The UAS control circuit can then control the UAS to carry the return package away from the delivery location.

As introduced above, the retractable interface system 206 may include an audio system, typically as part of the user interface 608. The audio system may couple with a transceiver to receive from and forward communications to the transceiver. The audio system may enable audio communications between a customer and one or more remote entities, such as but not limited to, a remote delivery service 104 that manages the delivery of the package, a payment system and/or service, an inventory system and/or service, a pilot operating through a pilot system, other entities, or combination of two or more entities.

Further, the UAS may include one or more cameras 512 and/or the interface system 206 may include one or more cameras. The UAS control circuit 502 and/or the interface system control circuit 602 may activate one or more of the cameras during a delivery process of delivering a package to capture video of the delivery of the package at the delivery location.

Figure 7:
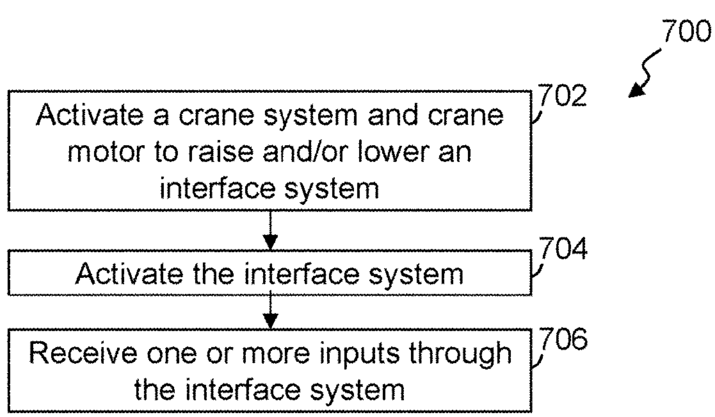
FIG. 7 illustrates a simplified flow diagram of an exemplary process of allowing customer interaction through a customer interface system during a delivery of package by a UAS, in accordance with some embodiments.

FIG. 7 illustrates a simplified flow diagram of an exemplary process 700 of allowing customer interaction through a customer interface system during a delivery of package by a UAS, in accordance with some embodiments. In step 702, a crane motor of a crane system coupled with a spool system is activated to drive the spool system. The activation can retract or extend a cord cooperated with the spool to raise and lower, respectively, a retractable interface system 206. In some implementations, the crane motor can be activated while the UAS is maintained in flight, such as at a threshold height relative to a delivery location where a package carried by the UAS is to be delivered.

In step 704, the retractable interface system 206 can be activated to allow a customer or other user to interact with the interface system. In step 706, one or more inputs are received from a customer at the delivery location through at least one input interface of the retractable interface system while the UAS is maintained in flight. The input may be through a touch screen, selecting one or more buttons, audio input, swiping a credit card or other type of payment, other such inputs, or a combination of two or more of such inputs.

In some instances, the input from a customer received through the interface system can cause the UAS 102 to take one or more actions in response to the input. A transceiver of the retractable interface system can communicate the input received through the retractable interface system to a UAS control circuit 502 of the UAS. The UAS control circuit can cause the UAS to implement one or more actions in response to the input. The action can be substantially any action, which may be a specific request that the UAS perform a particular action, and/or the UAS control circuit may determine to perform one or more actions based on the input. As an example, the UAS controller may initiate the delivery of the package (e.g., start lowering the package) in response to a confirmation that customer is present (e.g., through a customer entering in a code on the interface system), a customer may select an option to have the UAS change the delivery location (e.g., shift 10 feet forward), a customer may select an option to reject the delivery of a package, a customer may request a different package be returned, and/or other such inputs.

In some embodiments, a delivery authentication may be entered through the interface system by the customer. The delivery authentication is typically specific to an ordered product being delivered. The delivery authentication can be communicated to the UAS control circuit 502, the interface system control circuit 602, and/or other system to be used in authorizing the delivery of a package.

As described above, some embodiments may obtain proof of customer identity prior to and/or as part of delivery. Some embodiments wirelessly receive an authentication communication, through a wireless transceiver of the UAS 102. In some instances, the communication is transmitted from a wireless transceiver of the interface system 206, from a user interface unit 116 associated with the customer, or other such wireless transmitting device. The UAS 102, delivery service, payment system and/or other component or service may confirm an authorization to deliver the package based on the authentication communication. In response to the confirmation, the UAS can initiate the delivery of the package. Additionally or alternatively, the interface system 206 can, in receiving an input, capture a signature from the customer through a signature capturing system on the retractable interface system. This signature capture can be as part of a delivery process in delivering a package, such as a confirmation of an identification of a customer, a confirmation that the customer received a package, and the like.

In some embodiments, the UAS may be operated to provide a return service. The customer may enter an input through the interface system and/or from a user interface unit 116 that comprises a return request to return a different package. The UAS can cooperate with the package to be returned in response to the return request. In some instances, the UAS control circuit 502 can activate the crane system 204 in response to the return request. The crane system can lower a package coupling device that allows the customer to secure the package with the package coupling device. Once coupled (e.g., based on electrical detection through the package coupling device and/or confirmation from the customer, such as through the interface system), the crane system can hoist the package to be returned from the delivery location. The UAS can then carry the package being returned away from the delivery location.

The interface system 206 can, in some instances, be configured to provide communication between a customer and a remote delivery service. In some embodiments, at least audio communication is enabled through an audio system and transceiver of the retractable interface system 206 between the customer and the remote delivery service that may be managing the delivery of the package.

As described above, in some embodiments, the UAS 102 may include one or more cameras that allow the UAS to capture images and/or video. In some instances, the UAS control circuit can activate one or more of the cameras 512 during delivery of the package, upon retrieving a return package, in flight to or from a delivery location, upon confirming a delivery location and/or a safety of the delivery location, and other such situations. For example, one or more cameras can be activated to capture video of the delivery of the package at the delivery location.

In some embodiments, systems, apparatuses, methods, and processes are provided to utilize UASs in delivering packages. Some embodiments provide unmanned aircraft systems (UAS) comprising: a crane system comprising a first spool system and a crane motor cooperated with the first spool system, wherein the first spool system comprises a first cord that is extended and retracted in response to the crane motor driving the first spool; a retractable interface system cooperated with the first cord; a package holder configured to hold a first package to be delivered by the UAS at a delivery location; a control circuit coupled with the crane motor to control the crane motor; and a memory coupled to the control circuit and storing computer instructions that when executed by the control circuit cause the control circuit to perform the steps of: activate the crane motor to extend the first cord and lower the retractable interface system while the UAS is maintained in flight at least at a threshold height; wherein the retractable interface system comprises an input interface to receive input from a customer at the delivery location.

Some embodiments provide methods of delivering a package with an unmanned aircraft system (UAS), comprising: activating a crane motor of a crane system coupled with a first spool system to drive the first spool system, extending a first cord cooperated with the first spool and lowering a retractable interface system while the UAS is maintained in flight at least at a threshold height relative to a delivery location where a first package carried by the UAS is to be delivered; activating the retractable interface system; and receiving a first input from a customer at the delivery location through at least one input interface of the retractable interface system while the UAS is maintained in flight.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An unmanned aircraft system (UAS), comprising:

a crane system comprising a first spool system and a crane motor cooperated with the first spool system, wherein the first spool system comprises a first cord that is extended and retracted in response to the crane motor driving the first spool;

a physical retractable interface system secured with and cooperated with the first cord;

a package holder configured to hold a first package to be delivered by the UAS at a delivery location;

a control circuit coupled with the crane motor to control the crane motor; and a memory coupled to the control circuit and storing computer instructions that when executed by the control circuit cause the control circuit to perform the steps of:

activate the crane motor to extend the first cord and lower the retractable interface system while the UAS is maintained in flight at least at a threshold height;

wherein the retractable interface system comprises an input interface comprising a payment method system, a physical display and user selectable options configured to receive physical input from a customer at the delivery location when the retractable interface system is lowered and accessible to the customer while the UAS is maintained in flight, and wherein the retractable interface system further comprises a wireless communication interface and an interface system control circuit configured to control the payment method system to obtain payment information and cause the acquired payment information to be wirelessly communicated via the wireless communication interface to a remote payment system.

2. The system of claim 1, wherein the wireless communication interface comprises a transceiver such that the retractable interface system is communicatively coupled with the UAS, wherein a first input received through the retractable interface system is communicated to the control circuit and the control circuit is configured to cause the UAS to implement an action in response to the first input.

3. The system of claim 2, wherein the input interface is configured to allow a customer to enter a delivery authentication specific to an ordered product being delivered; and wherein the transceiver communicates the delivery authentication to the control circuit to be used in authorizing the delivery of the first package.

4. The system of claim 2, further comprising:

a wireless transceiver configured to wirelessly receive an authentication communication from a user interface unit associated with the customer;

wherein the control circuit is configured to confirm an authorization to deliver the first package based on the authentication communication and initiate the delivery of the first package.

5. The system of claim 2, wherein the first input comprises a return request to return a second package, wherein the control circuit is configured to activate the crane system in response to the return request and hoist the second package from the delivery location and cause the UAS to carry the second package away from the delivery location.

6. The system of claim 2, wherein the retractable interface system comprises:

an audio system coupled with the transceiver, wherein the audio system is configured to enable at least audio communication between the customer and a remote delivery service managing the delivery of the first package.

7. The system of claim 1, further comprising:

a camera;

wherein the control circuit is configured to activate the camera during delivery of the first package to capture video of the delivery of the first package at the delivery location.

8. The system of claim 1, wherein the input interface comprises a signature capturing system configured to capture a signature from the customer as part of a delivery process in delivering the first package.

9. A method of delivering a package with an unmanned aircraft system (UAS), comprising:

activating a crane motor of a crane system coupled with a first spool system to drive the first spool system, extending a first cord cooperated with the first spool and lowering a retractable interface system while the UAS is maintained in flight at least at a threshold height relative to a delivery location where a first package carried by the UAS is to be delivered;

activating the retractable interface system;

receiving a first input from a customer at the delivery location through at least one input interface of the retractable interface system while the UAS is maintained in flight, wherein the input interface comprises a payment method system to receive payment from the customer, a physical display and user selectable options configured to receive physical input from customer while the retractable interface system in lowered;

obtaining, from the customer and through the payment method system while the UAS is at the delivery location, payment information;

causing the acquired payment information to be wirelessly communicated via a wireless communication interface of the retractable interface system to a remote payment system.

10. The method of claim 9, further comprising:

communicating, through a transceiver of the wireless communication interface, the first input received through the retractable interface system to a control circuit of the UAS; and causing the UAS to implement an action in response to the first input.

11. The method of claim 10, further comprising:

receiving, through the input interface, a delivery authentication entered by the customer that is specific to an ordered product being delivered, and communicating the delivery authentication to the control circuit to be used in authorizing the delivery of the first package.

12. The method of claim 10, further comprising:

wirelessly receiving, through a wireless transceiver of the UAS, an authentication communication from a user interface unit associated with the customer;

confirming an authorization to deliver the first package based on the authentication communication; and initiating the delivery of the first package.

13. The method of claim 10, wherein the receiving first input comprises:

receiving a return request to return a second package;

activating the crane system in response to the return request and hoisting the second package from the delivery location; and causing the UAS to carry the second package away from the delivery location.

14. The method of claim 10, further comprising:

enabling, through an audio system and the transceiver of the retractable interface system, at least audio communication between the customer and a remote delivery service managing the delivery of the first package.

15. The method of claim 9, further comprising:

activating a camera during delivery of the first package and capturing video of the delivery of the first package at the delivery location.

16. The method of claim 9, wherein the receiving the first input comprises capturing a signature from the customer, through a signature capturing system of the retractable interface system, as part of a delivery process in delivering the first package.

17. The system of claim 1, wherein the payment method system comprises a credit card swipe system configured to obtain the payment information from the credit card being swiped through the credit card swipe system.

18. The method of claim 9, wherein the obtaining the payment information comprises detecting a credit card swiped through a credit card swipe system of the payment method system; and obtaining the payment information from the credit card.

* * * * *